(12) United States Patent
Rosen

(10) Patent No.: US 7,050,026 B1
(45) Date of Patent: May 23, 2006

(54) REVERSE IMAGES IN A DOT MATRIX LCD FOR AN ENVIRONMENTAL CONTROL DEVICE

(76) Inventor: Howard Rosen, 5756 Royalmount Avenue, Montreal, Quebec (CA) H4P 1K5

( * ) Notice: Subject to any disclaimer, the term of this patent is extended or adjusted under 35 U.S.C. 154(b) by 282 days.

(21) Appl. No.: 10/440,474

(22) Filed: May 15, 2003

(51) Int. Cl.
*G09G 3/36* (2006.01)
(52) U.S. Cl. .................... 345/87; 345/102; 236/94
(58) Field of Classification Search ............ 345/87, 345/94, 98, 99, 100, 101, 102, 211; 236/94
See application file for complete search history.

(56) References Cited

U.S. PATENT DOCUMENTS

| | | | | |
|---|---|---|---|---|
| 4,104,627 A | * | 8/1978 | Thuler ........................ | 345/50 |
| 5,347,293 A | * | 9/1994 | Wiedemann et al. ......... | 345/87 |
| 5,646,645 A | * | 7/1997 | Saegusa ..................... | 345/101 |
| 6,484,951 B1 | | 11/2002 | Mueller ..................... | 237/2 A |

* cited by examiner

*Primary Examiner*—Dennis-Doon Chow

(57) ABSTRACT

The present invention is a method for operating a backlighted dot matrix type LCD for displayed outputs from a programmable environmental control device, such as a programmable thermostat. The LCD is operated so that viewer elements of a displayed data item are non-opaque when a room where the LCD is located is darkened and the surrounding display elements are partially or completely opaque. Selected elements can also change from opaque to non-opaque to display an active condition.

8 Claims, 2 Drawing Sheets

REVERSE IMAGES IN A DOT MATRIX LCD FOR AN ENVIRONMENTAL CONTROL DEVICE

BACKGROUND OF THE INVENTION

The present invention relates to displays visible to a user of an environmental control device, especially a display on a programmable thermostat.

Dot-matrix type LCD's, which have display elements arranged in rows and columns, are used in great numbers. These LCD's available at present are classified into three types. The first is a positive type wherein some of the display elements become opaque when driven, thus defining characters, symbols, and graphic characters. The second is a negative type wherein some of the display elements become opaque when driven, whereby the remaining display elements define characters, symbols, and graphic characters. The third is a positive-negative type, which functions as a positive type when operated in the first operating mode and as a negative type when operated in the second mode. With most LCD's available now, it is possible to change the image contrast, that is, the ratio in brightness of the data items displayed to the background of the screen.

Dot-matrix type LCD's are common as user-visible displays on programmable thermostats for viewing of alphanumeric and iconic information. The displayed information relates to environmental conditions, HVAC equipment operation or non-operation, operational modes of the thermostat, and the like. Such displays are commonly lighted from behind or from the side. The backlighting from this planar element shines through non-opaque display elements of the LCD display, although the backlighting is blocked by display elements of the LCD display that are partially or completely opaque. Prior art thermostats have consistently been programmed so that data items are shown on the LCD as partially or completely opaque display elements.

SUMMARY OF THE INVENTION

The present invention is an environmental control device such as a programmable thermostat with a dot matrix type LCD (which may be backlighted) for display of user-viewable images against a surrounding set of display elements. In the invention, the contrast between the images (or a single image section) and its surrounding section of display elements is reversed upon the occurrence of certain conditions. The conditions setting off the contrast reversal can be a pre-set time or times, change in room illumination, occurrence of operating states sensed by the environmental control device, or other such conditions. If the pre-set times are close enough together, a user viewing the display perceives that images are "flashing". The "flashing" draws the attention of the user to that part of the display which is showing the reversals of image contrast. The entire display may exhibit the "flashing" activity. Alternately, a backlight may be switched on or off to draw the attention of the user to the display as a whole, which also provides a flashing effect to the user viewing the display.

The following is one embodiment of the invention. The programmable environmental control device with its display is in a room. When this room is lighted by natural or manmade lighting, user-viewable images are formed from display elements driven so that they are partially or completely opaque. The display elements substantially surrounding the image are clear. When the room is lighted, the backlighting may either be powered on or off, as ambient lighting is typically adequate to light the display elements of a dot matrix LCD. When the room is darkened, display elements forming the images are driven so that they are clear (i.e., negative) and the elements surrounding the images are partially or completely opaque (i.e. positive). The backlighting is powered so that light shines through the images and not through the surrounding section. A "backlighting" panel may actually provide lighting from sides of the LCD, although the effect will be to cause illumination to shine through non-opaque display elements.

When the LCD is located in a room that is dark and/or dimly lighted, the present inventor has found that the user can see images far more easily when they are clear and surrounding display elements are partially or completely opaque. In contrast to the present invention and typical in the prior art, the images will be formed from display elements driven so that they are opaque with all other display elements left essentially clear, i.e., as the positive type described above. The nature of the present backlighting used in thermostats results in a display that is hard to read from a distance in a dark or dimly lighted room. The amount of light from the backlight substantially "overglows" the images until a user approaches to about 5 feet from the prior art displays.

The present invention allows the user to accurately distinguish display images from a much greater distance in a dark or dimly lighted room. The backlight shines through the images so that the "overglow" or aura effect of the backlight is used to the advantage of displaying those elements, not obscuring them.

Images or image sections, as used herein, are a generally continuous set of pixels in the display that are contrasted with surrounding display elements. An image or image section comprises a letter, an icon, a line or dash, or other item that is required by the programmable environmental control device to be set apart from other images or image sections. A set of script letters may be joined and continuous, as in handwriting, or discontinuous in the manner of some fonts available for digital display. An image or image section need not be completely surrounded by contrasting display elements to be understandable to a user. Some overlap of a first image into other images can occur as long as the first image remains understandable to a user looking at the display. A contrast outline between the image and the surrounding display elements only needs to be continuous enough to allow the user to adequately distinguish the image.

However, adjacent display elements between an image and the surrounding section of elements need not be entirely opaque and non-opaque. An image can be partially opaque in an edge part between a central part of image and an outer edge of the image. In a darkened room, the central part elements are driven so that they are substantially clear and the edge part elements are driven so that they are partially opaque. Using a partially opaque edge part reduces the tendency of a glowing aura from the clear elements to obscure a sharp edge of the image. This is a less preferred form of the invention.

An object of the present invention is to provide an environment control device for more easily observing viewer elements backlighted in a darkened room.

Another object of the invention is to provide an apparatus which can adjust the image contrast of a display device after the occurrence of a condition. In response to a first condition, the display device reverses its image contrast at least in part of the display. In response to a second condition, the display device returns to its original state as to that part of the display whose image contrast was changed.

Separable images shown on a display of a programmable thermostat are typically combined to form words, graphics, icons, lines, geometric forms and other such items. These combinations with a sufficient surrounding set of display elements form what is referred to herein as a data item. However, a data item can contain only a single image. Data items are typically arranged to communicate information or aesthetics to a viewing user of the programmable environmental control device. All images in a data item are preferably driven in the same state (i.e., positive or negative), where the surrounding sections of the data item are driven to contrast with the images (i.e., negative or positive). This allows the user to see and understand the information or appreciate the aesthetics of the data item. When in a "flashing" mode, the data item will draw the user's attention to that part of the display. The occurrence of a change in the operation of the thermostat or information set to be displayed is a condition that will cause the image contrast to reverse. The user will then instantly know that a change has occurred in the thermostat operation or displayed information.

DETAILED DESCRIPTION OF THE INVENTION

The invention is now discussed with reference to the figures.

Figure 1:
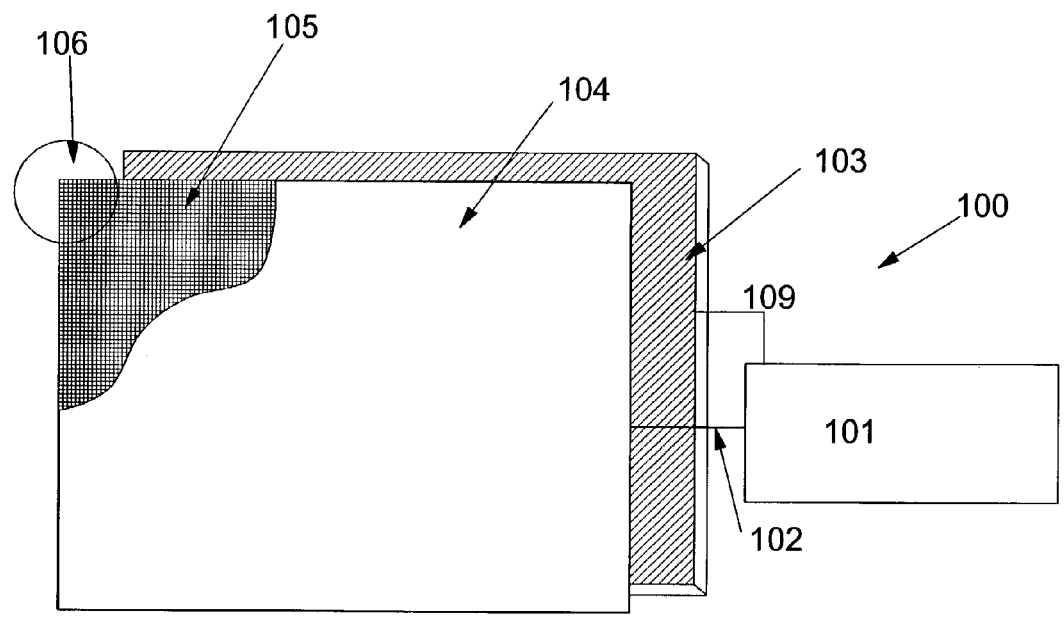
FIG. 1 is schematic and top view of a programmable environmental control device with a backlighted dot matrix type LCD.

FIG. 1 shows a thermostat 100 having means 101 for controlling HVAC equipment through programs resident in ROM and operational through RAM, where means 101 is effectively connected with multiple connections 102 with a dot-matrix liquid crystal display (LCD) panel 104 whose pixels 105 are driven by inputs to their vertical columns and horizontal rows from means 101. Panel 104 may be either a positive, negative or positive-negative type of dot matrix type LCD. Backlight panel 103 is shown for illustration as separated from a backside of LCD panel 104, although it is known and preferred that these two panels be in close contact. Backlight panel 103 is connected to power and a means of control so that it can be turned on or off as needed. Means 101 also optionally comprises means for sensing a light level or illumination in a room in which LCD panel 104 is located, which illumination may be compared with a previously input minimum illumination value to determine whether or not the room is darkened or dimly lighted. Means 101 comprises a clock and means for inputting one or more times of day. Upon the occurrence of the input time or times, one or more data items would experience an image reversal or enter a "flashing" mode.

Figures 2, 3:
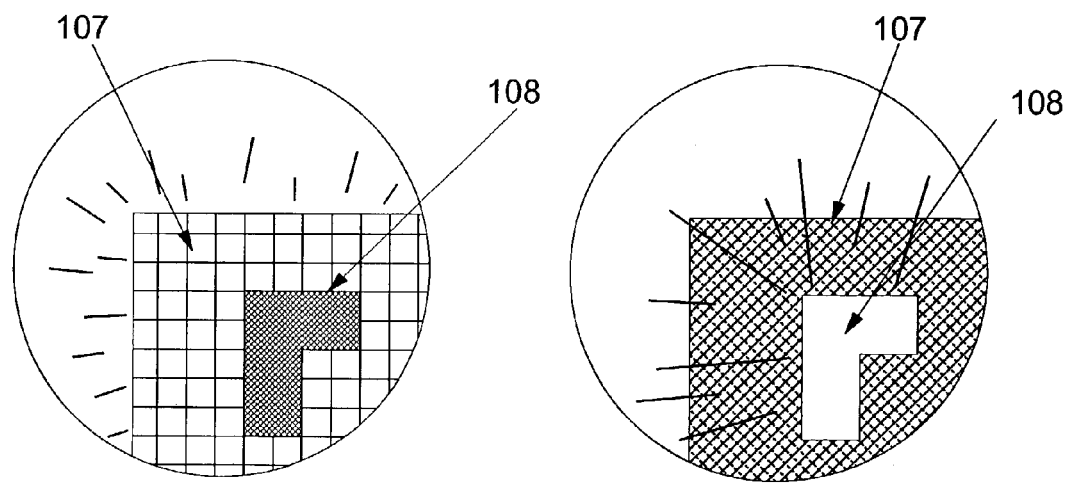
FIG. 2 is a magnified section 106 of FIG. 1.
FIG. 3 is an exemplary flow chart of the invention method.

FIG. 2 shows section 106 operated as it would preferably appear during a daytime or lighted room condition. In another preferred mode of operation, the display shown in FIG. 2 of the image section and surrounding section will be activated upon the occurrence of other conditions as described herein. The display elements of surrounding section 107 are essentially clear and, optionally, backlight panel 103 shines through them to a user in front of LCD panel 104. The display elements of image section 108 are partially or completely opaque. The combination of image section 108 and surrounding section 107 can constitute a data item comprehensible and legible to a user in a lighted room.

FIG. 3 shows section 106 operated as it would during a nighttime, darkened room or other described condition. The display elements of the surrounding section 107 are partially or completely opaque and backlight panel 103 cannot shine through them to a viewer in front of LCD panel 104. The display elements of image section 108 are essentially clear and backlight panel 103 shines through them to a viewer in front of LCD panel 104. The data item is thereby comprehensible and legible to the viewer in the darkened room. The result of this mode of operation is an dimmer display. An edge portion, as defined above, of image section 108 are those display elements that are adjacent to the surrounding section 107.

Figure 4:
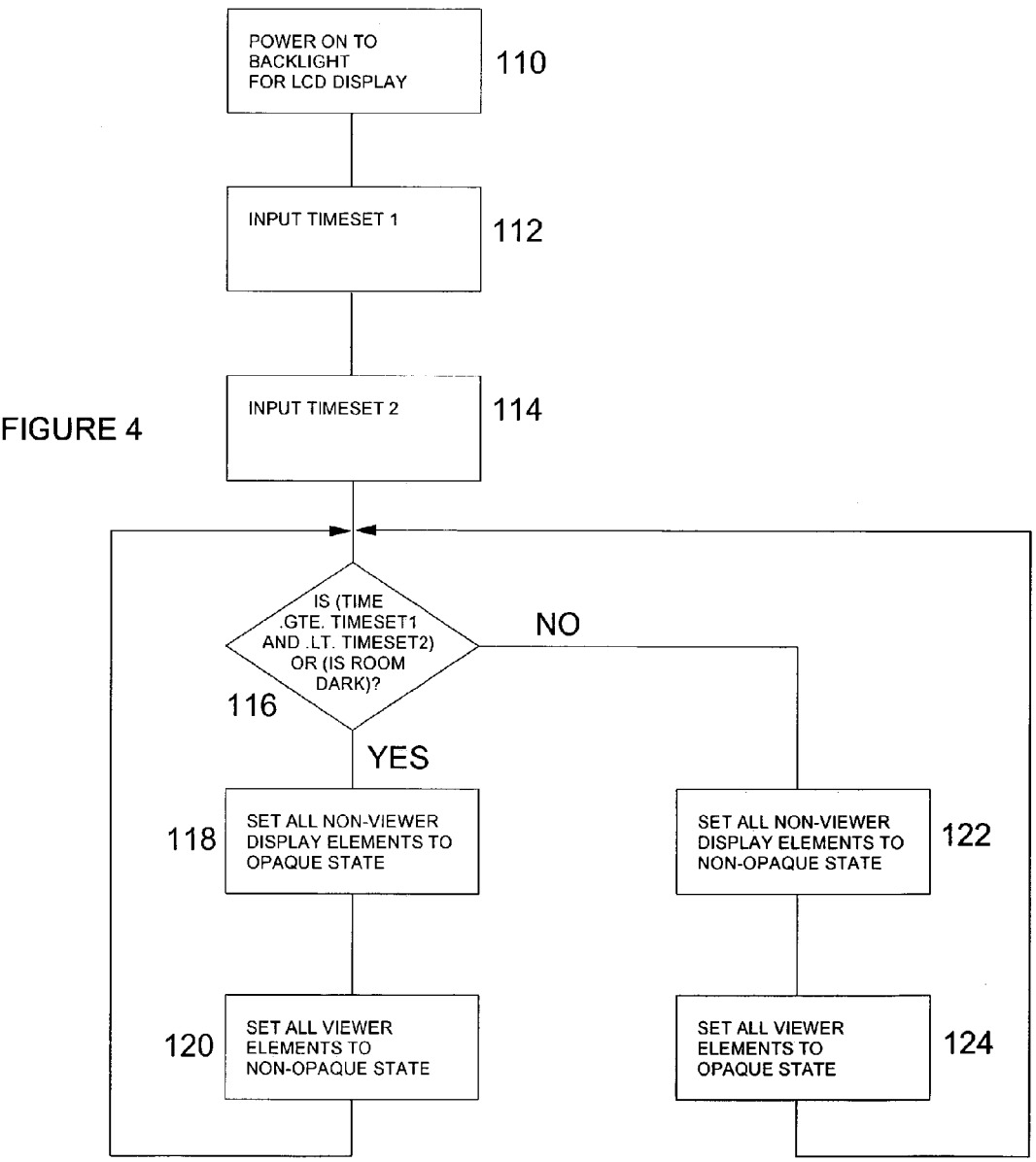
FIG. 4 is a high level process flow chart showing a principal feature of the invention.

FIG. 4 shows a general flow chart for a form of the invention method. Step 110 causes backlight panel 103 to turn on so that it shines forwardly through essentially clear and (in a limited way) partially opaque display elements of LCD panel 104. Step 112 requires an input of a time of day as timeset 1 when the sun generally goes down and/or the room is generally darkened for the room where LCD panel is located. Step 114 requires an input of a time of day as timeset 2 when the sun generally rises and/or the room is generally lighted for the room where LCD panel is located.

Step 116 evaluates whether a present time of day from a clock in means 101 is greater than or equal to timeset 1 and is less than timeset 2 or whether the room is dark (by comparison of present input from illumination sensing means in means 101 with a preset minimum illumination value in means 101). If one of the two conditions is met, step 118 causes all non-viewer display elements 107 (as in FIG. 3) to be partially or completely opaque. Step 120 follows causing all display elements of the image section 108 (as in FIG. 3) to be essentially clear (non-opaque). Step 116 follows 120 so that the conditions are continuously or periodically re-checked for compliance.

If neither of the two conditions of step 116 are met, step 122 causes all display elements of the surrounding section 107 (as in FIG. 2) to be driven so that they are essentially clear (non-opaque). Step 122 is followed by step 124 that causes all display elements of the image section 108 (as in FIG. 4) to be driven so that they are partially or completely opaque. Step 116 follows 124 so that the conditions are continuously or periodically re-checked for compliance.

Step 116 may be altered so that present room illumination is compared with a maximum pre-set value to determine if the room is lighted above a minimum level typically needed by a user for reading the invention display in a prior art manner for daytime operation, thereby causing steps 122 and 124 to be acted upon.

As described in the above summary of the invention, separable data items on a display device of a programmable thermostat can be shown so that each has a viewer section and a surrounding or non-viewer section. Image contrast between the viewer section and surrounding section allows the user to see the information. The image contrast will reverse at the occurrence of a change in the operation of the thermostat or information set to be displayed. The user will then instantly know that a change has occurred in the thermostat operation or displayed information.

The extent of the surrounding field may vary, but is intended that the surrounding field must extend away from the edges of a data item at least enough so that the letters or graphic items are easily comprehensible by a user standing in front of the display device. The display device can be divided into a number of data item fields. In one form of the invention, each data item field contains a data item whose image contrast between its viewer and non-viewer sections operate independently of those of other data item fields.

For example, in a display showing that a programmable thermostat is in a heating mode and operating the heater, a portion of its display device displays the word "HEAT" with the letters formed from a positively driven part of the display and a surrounding field negatively driven. The letters of the word "HEAT" would be a set of image sections and the display immediately around those letters would be their surrounding sections. The combination of the letters of the word "HEAT" and their surrounding fields would be a data item. When the thermostat is in a heating mode and the heater switches off, the image contrast of the data item is reversed. The letters of the word "HEAT" are formed from a negatively driven part of the display and the surrounding field is positively driven. In a flashing mode, the above image reversal would occur frequently enough so that a user looking at the display would notice the data item, such as at a rate of 1 to 2 image reversals or contrast reversals per second.

In summary, the present invention causes one or more data items that may be shown in a display of a programmable environmental control device:

1. to be shown in a first image contrast upon the occurrence of a first condition and then
2. to be shown with a reverse of the first image contrast upon the occurrence of a second condition.

The triggering conditions may be any of those which a programmable environmental control device may store, generate, receive or otherwise have available to its programs. In addition, one of the conditions that causes a change in image contrast may be an signal generated by manual switching by a user using a user interface with the programmable environmental control device. The interface may be a button on the programmable environmental control device.

It is well known in the art of programmable thermostats to provide basic on-off operation of HVAC equipment, sophisticated modal operation of that equipment and display of information such as time, temperature, humidity, equipment status, and the like. Each of the display indications of the thermostat operation and the items of information may be a separately operable data item, in that the image contrast may have a positively driven image section(s) in one data item and a negatively driven image section(s) in an adjacent data item. In a specific example, an indication of the day's weather may be shown on the display with the viewer section comprising a cloud, where if the day will be without rain the cloud is driven so that it is substantially clear and the surrounding section is darkened. If the day will be rainy, the viewer section cloud will be shown darkened and the surrounding field will be shown substantially clear. The condition upon which the reversal of image contrast occurs may be receipt of weather information by the programmable thermostat from a computer network that in turn receives weather predictions from various sources.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A method for operating a dot matrix type liquid crystal digital display that is optionally backlighted by a backlight for viewing by a user in a room where the liquid crystal digital display is located, where display elements of the liquid crystal digital display are driven by inputs from a programmable environmental control device that comprises control means for environmental control equipment comprising:
    (a) one or more data items capable of being displayed on the display, where each data item consists of one or more image sections and each image section is substantially surrounded by a surrounding section;
    (b) each image section is determined by the control means to be a set of substantially continuously adjacent display elements required for viewing by the user;
    (c) each surrounding section is determined by the control means to be a set of display elements required to substantially outline its image section;
    (d) presetting requirements of a first condition in the control means and determination by the control means that the first condition has occurred;
    (e) causing the image sections of a data item to be non-opaque and its surrounding sections to be partially or completely opaque;
    (f) presetting requirements of a second condition in the control means and determination by the control means that the second condition has occurred;
    (g) causing the image sections of a data item to be partially or completely opaque and its surrounding sections to be non-opaque; and
    (h) the first condition is a first time of day and the second condition is a second time of day.

2. The method of claim 1 wherein the first condition is a first time of day near sunrise and the second condition is a second time of day near sunset, whereafter the backlight is powered to shine through non-opaque or partially opaque display elements.

3. The method of claim 1 wherein, for at least one data item, the second time of day of the second condition is a second time period since the occurrence of the first time of day of the first condition.

4. The method of claim 1 wherein the occurrence of a third condition changes the first and second times of day, respectively, of the first and second conditions.

5. A method for operating a dot matrix type liquid crystal digital display that is optionally backlighted by a backlight for viewing by a user in a room where the liquid crystal digital display is located, where display elements of the liquid crystal digital display are driven by inputs from a programmable environmental control device for controlling environmental control equipment comprising:

(a) one or more data items capable of being displayed on the display, where each data item consists of one or more image sections and each image section is substantially surrounded by a surrounding section;

(b) occurrence of a first condition;

(c) causing the image sections of one or more of the data items to be non-opaque and its surrounding sections to be partially or completely opaque;

(d) occurrence of a second condition; and (e) causing the image sections of a data item to be partially or completely opaque and its surrounding sections to be non-opaque; and (f) the first condition is a first time of day and the second condition is a second time of day.

6. The method of claim 5 wherein the first condition is a first time of day near sunrise and the second condition is a second time of day near sunset, whereafter the backlight is powered to shine through non-opaque or partially opaque display elements.

7. The method of claim 5 wherein, for at least one data item, the second time of day of the second condition is a second time period since the occurrence of the first time of day of the first condition.

8. A method for operating a liquid crystal digital display panel that is optionally backlighted by a backlight panel for viewing by a viewer in a room in which the liquid crystal digital display panel is located, where the liquid crystal digital display panel is driven by inputs from a programmable environmental control device that controls the operation of environmental control equipment comprising:

(a) the liquid crystal digital display panel displaying one or more data items, each display item comprising:

(i) an image section determined by the environmental control device to be display elements required for viewing by the viewer and driven to a first state;

(ii) a surrounding section determined by the environmental control device to be display elements surrounding the viewer elements and driven to a second state, where the second state is different from first state so that the viewer of the data item field can see a contrast between the viewer section and the surrounding section;

(b) determination by the programmable environmental control device of a first time of day or receipt of a signal generated by manual switching by a user using a user interface as a first condition; and (c) after determination of the first condition, causing the display elements of the image section to be driven in the second state and the surrounding section to be driven in the first state, resulting in a visible image reversal to the viewer.

* * * * *